(12) United States Patent
Schumacher et al.

(10) Patent No.: US 10,602,661 B2
(45) Date of Patent: Mar. 31, 2020

(54) MOWING CUTTER DRIVE

(71) Applicant: EWM Eichelhardter Werkzeug- und Maschinenbau GmbH, Eichelhardt (DE)

(72) Inventors: Heinrich Gunter Schumacher, Eichelhardt (DE); Ralf Schmidt, Morsbach (DE)

(73) Assignee: EWM Eichelhardter Werkzeug- und Maschinenbau GmbH, Eichelhardt (DE)

( * ) Notice: Subject to any disclaimer, the term of this patent is extended or adjusted under 35 U.S.C. 154(b) by 556 days.

(21) Appl. No.: 15/293,628

(22) Filed: Oct. 14, 2016

(65) Prior Publication Data

US 2017/0094898 A1    Apr. 6, 2017

Related U.S. Application Data

(63) Continuation of application No. PCT/EP2015/057978, filed on Apr. 13, 2015.

(30) Foreign Application Priority Data

Apr. 16, 2014    (DE) .................. 10 2014 105 457

(51) Int. Cl.
*A01D 34/30*    (2006.01)
*F16H 21/44*    (2006.01)
(Continued)

(52) U.S. Cl.
CPC ............ *A01D 34/30* (2013.01); *F16H 19/02* (2013.01); *F16H 21/44* (2013.01); *F16H 37/12* (2013.01); *A01D 34/14* (2013.01); *A01D 2101/00* (2013.01)

(58) Field of Classification Search
CPC ........ A01D 41/14; A01D 34/30; A01D 34/04; A01D 34/006; A01D 34/145; A01D 34/02;
(Continued)

(56) References Cited

U.S. PATENT DOCUMENTS 1,754,188 A    4/1930 Coldwell
3,973,378 A *  8/1976 Bartasevich ........... A01D 34/37
                                                     56/11.9
(Continued)

FOREIGN PATENT DOCUMENTS

DE    1712943    12/1955
DE    2921232     4/1980
(Continued)

OTHER PUBLICATIONS

Indian Office Action dated Aug. 27, 2019 in corresponding Indian Application No. 201647034900.

*Primary Examiner* — Robert E Pezzuto
(74) *Attorney, Agent, or Firm* — Harness, Dickey & Pierce, P.L.C.

(57) ABSTRACT

A drive (100) has two gearing arrangements (101, 102) both with a first gearing (103) and a second gearing (104). Each gearing (103, 104) has at least one transfer element (106) for transferring a reciprocating motion of a driving hinge point (107) into a reciprocating motion of an output hinge point (108). Output elements (117) are coupled to the output hinge points (108) of the two gearings (103, 104). A drive element (116) is coupled to the driving hinge points (107). A common drive element (116) is connected to the driving hinge points (107) of the gearings (103, 104) of the two gearing arrangements (101, 102). The gearing arrangements (101, 102) are mirror-symmetrically arranged so that the output elements (117) are driven on a common output axis in an opposed manner with respect to each other.

12 Claims, 3 Drawing Sheets

(51) Int. Cl.
*F16H 19/02* (2006.01)
*F16H 37/12* (2006.01)
A01D 34/14 (2006.01)
A01D 101/00 (2006.01)

(58) Field of Classification Search
CPC ......... A01D 34/14; F16H 19/02; F16H 21/44; F16H 23/08; F16H 37/12
USPC ............... 56/257, 289, 299, 296; 74/595, 60
See application file for complete search history.

(56) References Cited

U.S. PATENT DOCUMENTS

| | | | |
|---|---|---|---|
| 4,295,780 A | | 10/1981 | Wada et al. |
| 4,866,921 A | * | 9/1989 | Nagashima ............ A01D 34/30 56/257 |
| 6,273,214 B1 | | 8/2001 | Schumacher |
| 7,520,118 B1 | * | 4/2009 | Priepke ................. A01D 34/30 56/257 |
| 9,545,051 B2 | * | 1/2017 | Cook .................... A01D 34/145 |
| 9,545,052 B2 | * | 1/2017 | Cook .................... A01D 34/30 |
| 9,668,407 B2 | * | 6/2017 | Cook .................... A01D 34/145 |
| 9,781,879 B2 | * | 10/2017 | Cook .................... A01D 34/30 |
| 2011/0099964 A1 | | 5/2011 | Coers et al. |

FOREIGN PATENT DOCUMENTS

| | | |
|---|---|---|
| DE | 36 15 058 A1 | 11/1987 |
| DE | 19542550 | 5/1997 |
| DE | 102009040230 | 4/2011 |
| DE | 102010040870 | 5/2011 |
| EP | 2182249 | 5/2010 |
| JP | 5-118401 | 5/1993 |
| JP | 2002-156015 | 5/2002 |

\* cited by examiner

MOWING CUTTER DRIVE

CROSS-REFERENCE TO RELATED APPLICATIONS

This application is a continuation of International Application No. PCT/EP2015/057978, filed Apr. 13, 2015, which claims priority to German Application No. 10 2014 105 457.1, filed Apr. 16, 2014. The disclosures of the above applications are incorporating herein by reference.

FIELD

The disclosure relates to a drive with two identical gearing arrangements with, respectively, a first gearing and a second gearing. Each of the gearings has at least one transfer element. The transfer element transfers a rectilinear translatory reciprocating movement of a driving hinge point, in a driving direction, into a rectilinear translatory reciprocating movement of an output hinge point, in an output direction deviating from the driving direction. An output element is provided for each gearing arrangement. Each output elements is connected to the output hinge points of both gearings of the respective gearing arrangement. The output element couples the output hinge points at a fixed distance to each other. A common drive element is provided. The common drive element is connected to the driving hinge points of the gearings of both gearing arrangements. The common drive element couples the driving hinge points at a fixed distance to each other. The gearing arrangements are arranged mirror-symmetrically to each other. Thus, the output elements of both gearing arrangements are driven on a common output axis in opposite directions.

BACKGROUND

Known mowing knife drives are realized in different types of construction. Especially for mowing knives for large mowing widths, particularly with width of up to 18 meters, i.e. where high performance is needed. Such drive units include one gearing unit that converts a rotational movement directly into a reciprocating movement. The drive unit is directly operatively connected to oscillatingly drive the knife head of the mowing knife.

U.S. Pat. No. 6,273,214 B1 shows an angular gear arrangement to drive a cutting knife. In this case, a first gearing unit is provided. The unit converts a rotational movement into a translatory movement to drive the cutting knife. Furthermore, a second gearing unit is provided in the form of an angular gearing. The second gearing unit changes the direction of rotation. The drive unit is driven by a motor arranged at a distance, via a belt drive and a pulley. In this case, the rotation of the pulley, which rotates around a horizontal axis, is transferred into a rotational movement around a vertical axis. Thus, the second gearing unit is in the form of an angular gearing.

A gearing unit to drive a cutting knife is further described in DE 36 15 058 C2. The unit has a housing that forms a first axis. The gearing unit has a rotor rotatably supported in the housing around the first axis. It is driven by a drive aggregate. In the housing, a ring gear with internal teeth is stationarily mounted. Thus, it does not rotate relative to the housing. The rotor is held in bearings in the housing. On the rotor itself, a pinion is further rotatably supported around a second axis. The second axis is radially off-set to the first axis. The pinion forms the output element of the gearing and meshes with a ring gear.

In practice, such a gearing unit is driven by a belt drive from a drive motor. Additionally, a flywheel is often provided to enable operations with sudden occurring loadings. Furthermore, hydraulic motors are used for the drive. However, these drive units need a large space. The maximal mowing width is reduced as these drive units are arranged laterally to the cutting knife in an axial extension of the direction of movement of the cutting knife. Accordingly, the drives are arranged externally at the ends of the cutting knives. Thus, special precautions are taken to enable support of large weights of the drives at the outside.

A drive for a cutting device is shown in DE 10 2009 040 230 B4. Here, a cutting knife is driven by a gearing, as shown in FIG. 1. The cutting device is for an agricultural machine schematically shown in FIG. 1. It has a gearing 10 that drives a cutting knife 12. For clarity, the cutting knife 12 is only partially shown in FIG. 1. The cutting knife 12 can be a mowing knife of a harvesting machine, like a combine harvester. The gearing 10 is preferably stationarily mounted on the cutter bar that guides the cutting knife.

A countershaft 14 is shown schematically in FIG. 1. The countershaft 14 drives a crank drive 16, the gearing 10 and the cutting knife 12. The countershaft 14 extends transversally to the driving direction of the agricultural machine and is rotatingly driven.

The gearing 10 has a housing 18 of which a half shell is schematically shown in FIG. 1. A rocker 20 is accommodated in the housing 18. The rocker 20 can carry out a rocking movement in a plane corresponding to the drawing plane. A concave guide contour 22 is formed on an inner side on the wall of the housing 18. The concave guide contour 22 extends along an arc around a gearing-side fixed point 24 and corresponds, in the shown example, to an approximate quadrant.

The rocker 20 has a convex arc-like outer contour 26. The rocker outer contour 26 extends around a guide point 28 of the rocker 20. The outer contour 26 corresponds, at least more or less, to half a circle. In this case the outer contour 26 has a radius R. The guide contour 22 has a radius of 2R. The outer contour 26 and the guide contour 22 include teeth that engage each other. Thus, the rocker 20 meshes with the guide contour 22 and is restricted to roll on the guide contour 22.

To prevent lifting of the rocker 20 from the guide contour 22, the rocker is connected in an articulated manner at the guide point 28 to a guide rod 30. The guide rod 30 is connected in an articulated manner at the gearing-side fixed point 24 to the housing 18. The distance between the gearing-side fixed point 24 and the guide point 28 is approximately R. Thus, a restricted guidance is provided of the guide point 28 on the arc with the radius R around the gearing fixed point 24. Alternatively, the guide rod 30 can be substituted by a roller. The roller is rotatably supported around the guide point and rolls on a convex guide crank around the gearing-side fixed point 24.

A driving hinge point 34 and an output hinge point 32 of the rocker 20 are arranged at a distance of approximately R away from the guide point 28. Rolling of the rocker 20 on the guide contour 22 (rocking movement) causes a rectilinear reciprocating movement in the direction toward the gearing-side fixed point 24 and away from the same. The guide rod 30 and the teeth force a linear guidance of the hinge points 32, 34.

At output element 36, in the form of a rod, is connected in an articulated manner to the rocker 20 at the output hinge point 32. The output element 36 is guided out of the housing 18 in a loose manner in a straight line. It is sealed by a convoluted boot 38. The output element 36 is connected in an articulated manner, via a holder 40, to allow alignment compensation, to the cutting knife 12. The longitudinal extension of the cutting knife 12 is parallel to the direction of the reciprocating movement of the output hinge point 32. Small alignment errors between the cutting knife 12 and the point 32 can be compensated by articulation and/or alignment compensation of the holder 40. In the example shown in FIG. 1, the cutting knife 12 is arranged as an extension of the output element 36.

A drive element 42 is connected at the driving hinge point 34. The drive element 42 is a connecting rod of the crank drive 16. It is connected, via a ball joint, in an articulated manner to the rocker 20. The drive element 42 is guided out of the housing 18 in a loose manner. The other end of the drive element 42, at the crank drive, follows a circular path. The loose, articulated connection to the rocker 20 enables a reciprocating movement of the output element 42.

When the counter shaft 14 is rotatily driven, the crank drive 16 moves, via the connecting rod or the driving element 42, the second hinge point 34, in a rectilinear reciprocating movement. This reciprocating movement is transferred by the restrictingly guided rocker 20, by 90°, to the output element 36. In turn, it is transferred onto the cutting knife 12. In the shown example, the angle between the two directions of movement is 90°. The linear movement of the hinge points 32, 34 is defined by the restricted guidance of the rocking movement. Thus, no guidance of the drive and output elements 42, 36 is necessary on the housing 18. Due to the restricted movement of the rocker 20, no literal forces are produced on the output side. Thus, an exact, wear minimizing linear guidance of the cutting knife 12 is possible on the cutter bar. A transverse rotation of the rocker 20, out of the drawing plane in FIG. 1, is prevented by a two-dimensional guidance. A plane, lubricated sliding or rolling guidance, of the rocker 20 rides on a base face of the housing 18.

DE 10 2009 040 230 B4 further describes further, that two oppositely driven cutting knives are centrally driven by two such gearings.

JP 2002-156015 A describes a drive for a heald frame of a weaving machine. The driving motion of a linear motor is converted, via cranks, into a reciprocating motion of the heald frame. The heald frame is connected via hinge points to the pivotingly driven links.

SUMMARY

It is an object of the present disclosure is to provide a mower cutting knife drive that enables a translatory movement of the output element with fewer linear guiding elements.

The object is met by a drive with two identical gearing arrangements having, respectively, a first gearing and a second gearing. Each of the gearings has at least one transfer element. The transfer element transfers a rectilinear translatory reciprocating movement, of a driving hinge point in a driving direction, into a rectilinear translatory reciprocating movement, of an output hinge point in an output direction deviating from the driving direction. Each gearing arrangement is provided with an output element. The output elements are connected to the output hinge points of both gearings of the respective gearing arrangement. The output elements couple the output hinge points at a fixed distance to each other. A common drive element is provided. The common drive element is connected to the driving hinge points of the gearings of both gearing arrangements. The common drive element couples the driving hinge points at a fixed distance to each other. The gearing arrangements are arranged mirror-symmetrically to each other. Thus, the output elements of both gearing arrangements are driven on a common output axis opposed to each other. The common drive element drives the driving hinge points of both gearings of each gearing arrangement. The common drive element is connected to the driving hinge points of both gearings of each gearing arrangement. The common drive element couples the driving hinge points at a fixed distance to each other.

Thus, differing from the State of the Art, all output hinge points of all gearings are coupled via the common drive element at a fixed distance to each other. All output hinge points of all gearings are coupled, via the output element at a fixed distance to each other. Thus, a type of parallelogram arrangement is achieved with fixed reference points to each other. Since both transfer elements are driven by the common drive element, the output element between the two output hinge points is not acted upon by tensile nor compression forces. Therefore, the output element does not have to be dimensioned concerning the drive power. Furthermore, the output element is moved rectilinear translatory and can be directly connected to a cutting knife, that is to be driven rectilinearly. Alternatively, the cutting knife itself may form the output element. Since two gearing arrangements are provided, two cutting knives can be driven in opposite directions to each other.

The driving hinge point of a gearing with a first gearing arrangement of the two gearing arrangements is identical to a driving hinge point of a gearing of a second gearing arrangement of the second gearing arrangement. Thus, this enables a compact design.

The two gearing arrangements can be accommodated in a common housing. Thus, a compact construction unit is achieved for the drive. The drive is used to drive two cutting knives of a cutter bar driven in opposite direction.

At least one transfer element of the at least one of the two gearings is guided in a restricted manner. The rectilinear translatory reciprocating movement of the driving hinge point in the driving direction is transferred into a rectilinear translatory reciprocating movement of the output hinge point in the output direction. The at least one transfer element of both gearings is guided in such a restricted manner. Due to the restricted guidance of the at least one transfer element, the common drive element and the output element do not have to be guided in a restricted manner. The guidance of the drive element and of the output element is achieved automatically by the restricted guidance of the transfer elements. Thus, no further guide elements or similar means is necessary. These elements can be guided separately for a more exact linear guidance of the drive element and/or of the output element. For example, they may be guided relative to a housing of the drive.

The drive element can be formed in different ways and can be driven in different manners. The drive element is connected to at least a driver, driven by a cam disc. The cam disc, in this case, can be rotatingly driven around an axis of rotation. The cam disc has a guide path extending around the axis of rotation. The at least one driver of the drive element is guided on the guide path. The guide path has, when seen along its circumference, a varying distance to the axis of rotation. Thus, the drive is reciprocatingly moved in a translatory manner radially to the axis of rotation. The guide path can be arbitrarily formed. Thus, the translatory movement of the output element can be adapted. For example, the guide path can be formed such that in a reversal of the rotational direction a lower velocity of the output element is achieved. Thus, the vibrations of the drive are reduced. Further, it has been shown, that in a sinus-like movement of the drive element different velocities are achieved over time at the two rotational direction reversal points of the output element. This movement can be selected symmetrically by means of a corresponding shaping of the guide path.

At least one, preferably both, of the gearings have a rocker as the transfer element. The rockers are adapted to carry out a limited rocking movement. The rocker is guided in a restricted manner such that, during the rocking movement, a guide point of the rocker maintains a constant distance from a gearing-side fixed point. The rocker has, in this case, the driving hinge point and the output hinge point.

In one or both of the gearings, the rocker is guided in a restricted manner by a guide rod. The guide rod is pivotable around the guide point. Also, the guide rod is pivotable around a pivot axis that extends through the gearing-side fixed point.

In one or both of the gearings, the rocker has an outer contour formed like a segment of a circle with a radius R. The gearing has a concave guide contour. The guide contour is formed like a segment of a circle with a radius that is approximately twice as large as the radius of the outer contour of the rocker. The rocker outer contour is in rolling contact with the concave guide contour.

The rockers of both gearings are guided in a restricted manner by a guide rod. In this case, the outer contours, formed like a segment of a circle, and the concave guide contours are not compulsorily necessary.

The outer contours of the rockers and the guide contours can have respective teeth meshing with one another.

Generally, the gearings can be formed like the gearings according to DE 10 2009 040 230 B4.

A cutting knife drive may include a drive described above. The output element has a connection mechanism so that the output element is connectable below a cutting knife.

A mower of an agricultural machine may include the above described drive. The output element of a gearing of a first gearing arrangement of the two gearing arrangements is connected to a first cutting knife. The output element of a gearing of a second gearing arrangement of the two gearing arrangements is connected to a second cutting knife.

Thus, a compact drive is achieved for two cutting knives driven in opposite directions. The drive is coupled in the center between the two cutting knives to save space. The drive is arranged, when viewed in a driving direction, behind the mowing knives. Thus, relative to the width of the mower, no space is required, rather the total width of the mower is available for the mowing knives. Furthermore, the described drive has a very flat design that can be arranged in a space saving manner behind the cutter bar.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 2:
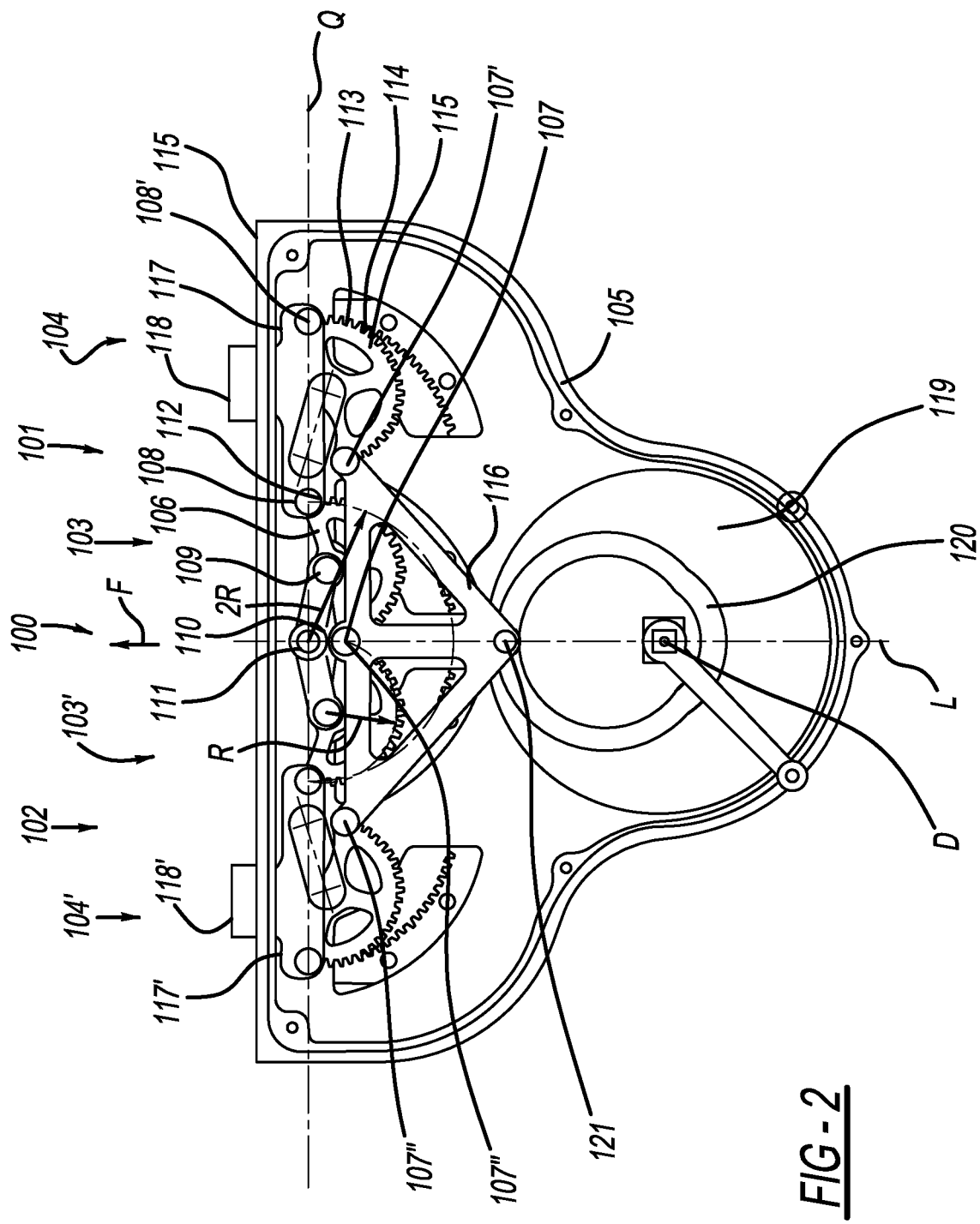
FIG. 2 is a top plan view of a drive in a first position according to the disclosure.
Figure 3:
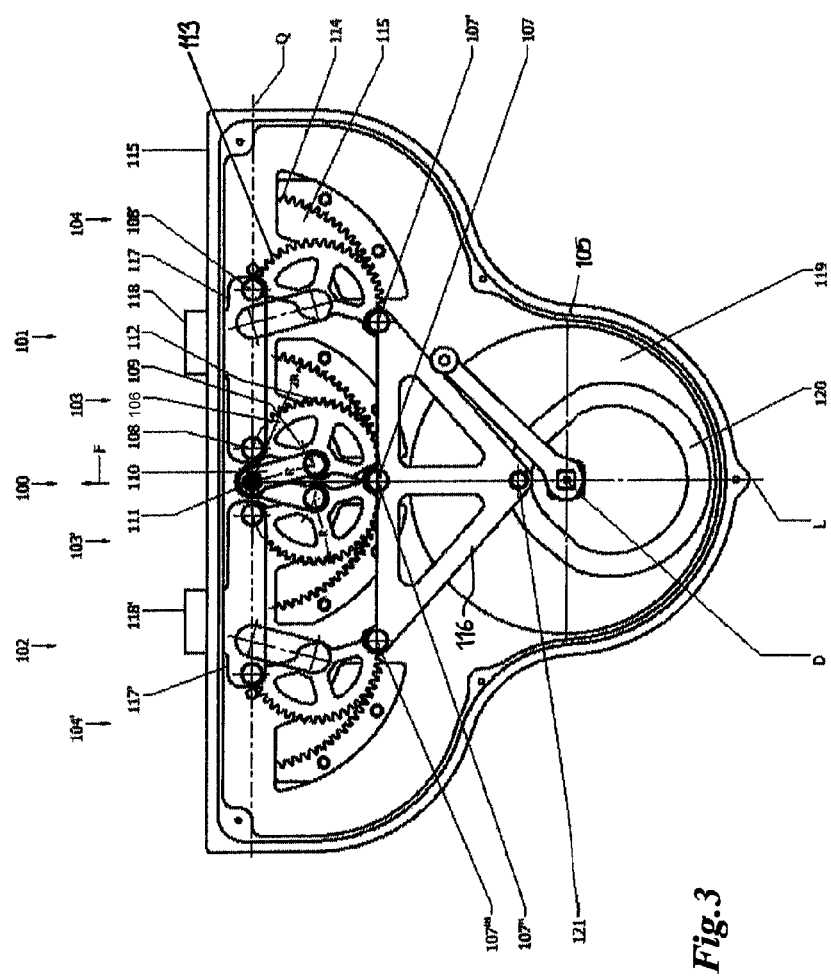
FIG. 3 is a top plan view of the drive of FIG. 2 in a second position.

FIGS. 2 and 3 illustrate a drive according to the disclosure for a mowing knife of a mower bar of an agricultural machine. The figures illustrate positions and are described together in the following.

FIGS. 2 and 3 show a drive 100 with a first gearing arrangement 101 and a second gearing arrangement 102 accommodated in a common housing 105. The two gearing arrangements 101, 102 are formed mirror-symmetrically to a longitudinal axis L. In this case, the longitudinal axis L is aligned in a driving direction F of the agricultural machine. The arrangement of the gearing arrangements 101, 102 in a common drive housing 105 enables the drive to be mounted in an agricultural machine as an assembly unit. The unit serves as a drive in a mower with two oppositely driven mowing knives. The drive is arranged in the center of the mower. Generally, in harvesting machines, the flow of the crop takes place in this area. Thus, the harvested crop is transported from the mower to the units, for example a chopper, arranged behind the harvesting machine. This area is very restricted with respect to mounting space. Especially in the height direction, the mounting space is distinctly limited. The drive according to the disclosure provides a flat drive. The flow of the crops can take place above the drive.

The components of the individual gearing arrangements 101, 102 are the same and are indexed with the same reference numerals. Representatively for both gearing arrangements, the gearing arrangement 101, shown at the right, is described in more detail.

The first gearing arrangement 101 has a first gearing 103 and a second gearing 104. The gearings 103, 104 are identically structured with respect to their function and construction. The first gearing 103 has a transfer element in form of a rocker 106. The rocker 106 has a driving hinge point 107 and an output hinge point 108. The hinge point 107 connects the rocker 106 to a drive element 116. The output hinge point 108 connects, the rocker 106 to an output element 117. The rocker 106 has a guide point 109 represented in the form of a pin joint. The rocker 106 is connected to a guide rod 110 on the guide point 109. The guide rod 110 is pivotably connected around the guide point 109 to the rocker 106. The guide rod 110 is pivotably mounted around a gearing-side fixed point 111 on the housing 105. Thus, the rocker 106 can carry out a rocking movement. Also, the guide point 109 has a fixed distance to the gearing-side fixed point 111.

The rocker 106 has an outer contour 112 formed like a segment of a circle. The contour includes outer teeth 113. The outer contour 112 is arranged centrally to the guide point 109 and has a radius R. The distance between the guide point 109 and the gearing-side fixed point 111 corresponds to the radius R.

The first gearing 103 also has a concave guide contour 114 with inner teeth 115. The outer teeth 113 of the rocker 106 meshs with the inner teeth 115. The inner teeth 115 are arranged centrally to the gearing-side fixed point 111 along the guide contour 114 that has a radius of 2R. The radius of the guide contour, with the inner teeth 115, is thus double the size of the radius of the rocker outer contour 112 with outer teeth 113.

The forced guide of the rocker 106 ensures that a rectilinear translatory movement of the drive hinge point 107 along the longitudinal axis L in a driving direction is converted into a rectilinear translatory movement of the output hinge point 108 along a transversal axis Q in an output direction. The transversal axis Q is arranged at a right angle to the longitudinal axis L.

Figure 1:
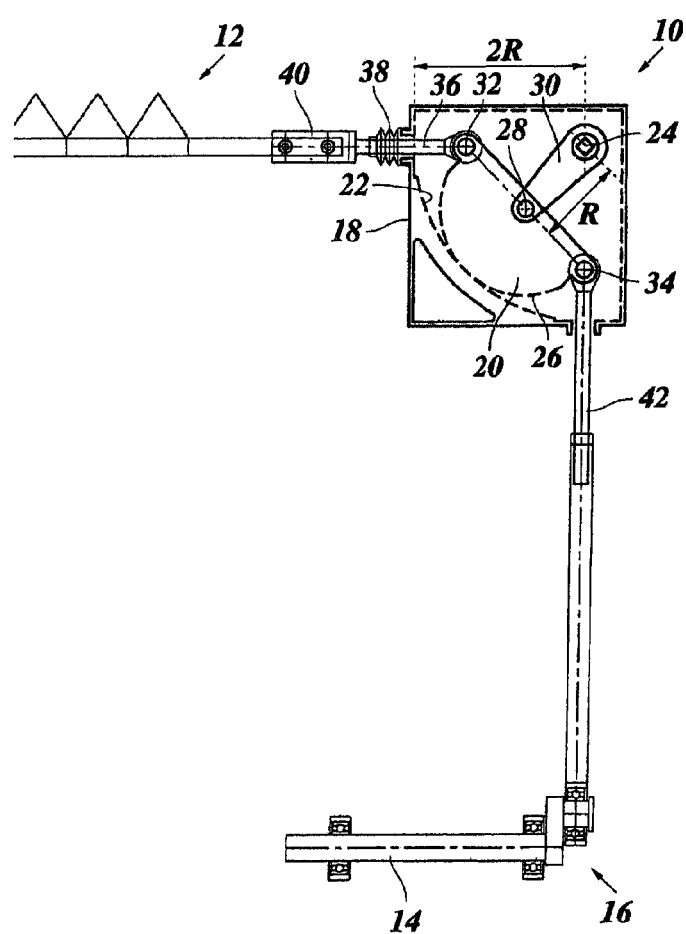
FIG. 1 is a schematic view of a prior art drive with a housing and gear used in a drive.

Thus, basically the first gearing 103 is constructed similar to the above described gearing in FIG. 1.

The second gearing 104 of the first gearing arrangement 101 is functionally identically constructed to the first gearing 103. Corresponding components are provided with the same indexed reference numerals referred to the description concerning the first gearing 103. The drive element 116 is connected to the drive hinge point 107 of the first gearing 103 as well as to the drive hinge point 107' of the second gearing 104. The output element 117 is connected to the output hinge point 108 of the first gearing 103 as well as to the output hinge point 108' of the second gearing 104. Thus, a parallelogram arrangement is achieved. It is formed by the drive element 116, the two rockers 106, 106' of the first gearing 103 and of the second gearing 104, as well as the output element 117. The restricted guidance of the rockers 106, 106' guides the drive element 116 and the output element 117 in a restricted manner. The drive element 116 is driven along the longitudinal axis L and the output element 117 is driven along the transversal axis Q.

The second gearing arrangement 104 is, as already mentioned above, formed mirror-symmetrically to the first gearing arrangement 103. In this case, the drive hinge point 107 of the first gearing 103 of the first gearing arrangement 101 is arranged on the drive hinge point 107" of the first gearing 103' of the second gearing arrangement 102. Both drive hinge points 107 are connected to the drive element 116. The drive element 116 is connected to the drive hinge point 107" of the second gearing 104' of the second gearing arrangement 102.

The control arm 110" of the first gearing 103' of the second gearing arrangement 102 is connected around the same gearing-side fixed point 111 to the housing 105.

The two output elements 117, 117' both move along the transversal axis Q opposite to each other. They have respective connection means 118, 118' that connect each of the output elements 117, 117' to the mowing knife. The connection means 118, 118' are guided, in this case, out of the housing 105. The output hinge points 108, 108' of both gearing arrangements 101, 102 are arranged on a common axis, namely the transversal axis Q.

The drive element 116 can be driven in different ways. The drive element 116 can, for example, be driven via a crank drive. Here, a rotational movement is converted into a rectilinear translatory reciprocating movement. A drive according to EP 1 772 051 B1 is also possible. Here, a rotational movement is converted, via planetary gear sets, into a rectilinear translatory movement.

In FIG. 2 a further embodiment is shown, namely a drive via a cam disc 119. The cam disc 119 is rotatingly driven around an axis of rotation D in the housing 105. The cam disc 119 includes a guide path 120 in the form of a groove. The groove 120 extends around the axis of rotation D. The guide path 120 has, distributed along its circumference around the axis of rotation D, a varying distance to the axis of rotation D. In the guide path 120, a driver 121, fixed to the drive element 116, engages the groove. The driver 121 is arranged on the longitudinal axis L, in the same manner as the axis of rotation D. As soon as the cam disc 119 rotates around the axis of rotation D, the distance of the guide path 120 to the axis of rotation D changes in the intersecting point with the longitudinal axis L. Thus, the drive element 116 is transferred into a rectilinear translatory reciprocating movement. Generally, other shapes of the guide path and of the driver are possible. For example, two drivers can be provided. They are supported on opposed flanks of the guide path. Also, it is possible, that the guide path is not formed as a groove but as a beading or the like. Here, one or more, preferably two, drivers are supported. The drivers can be in contact in all cases in the form of sliders or as rollers in the form of a rolling contact with the guide path.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drive with two identical gearing arrangements having, respectively, a first gearing and a second gearing comprising:
    each of the gearings has at least one transfer element for transferring a rectilinear translatory reciprocating movement of a driving hinge point in a driving direction into a rectilinear translatory reciprocating movement of an output hinge point in an output direction deviating from the driving direction;
    each gearing arrangement includes an output element connected to the output hinge points of both gearings of the respective gearing arrangement wherein the output elements of each gearing arrangement couples the output hinge points of both gearings of the respective gearing arrangement at a fixed distance to each other;
    a common drive element is connected to the driving hinge points of the gearings of both gearing arrangements, the common drive element couples the driving hinge points at a fixed distance to each other;
    the gearing arrangements are arranged mirror-symmetrically to each other, the output elements of both gearing arrangements are driven on a common output axis in opposite directions; and
    the common drive element drives the driving hinge points of both gearings of each gearing arrangement.

2. The drive according to claim 1, wherein the driving hinge point of a gearing of a first gearing arrangement of the two gearing arrangements is identical to a driving hinge point of a gearing of a second gearing arrangement of the two gearing arrangements.

3. The drive according to claim 1, wherein the two gearing arrangements are accommodated in a common housing.

4. The drive according to claim 1, wherein the at least one transfer element of at least one of the gearings is guided in a restricted manner such that the rectilinear translatory reciprocating movement of the driving hinge point in the driving direction is transferred into a rectilinear translatory reciprocating movement of the output hinge point in the output direction.

5. The drive according to claim 1, wherein the common drive element is connected to at least one driver that is driven via a cam disc.

6. The drive according to claim 5, wherein the cam disc is rotatingly driven around an axis of rotation, the cam disc has a guide path extending around the axis of rotation, and the drive element includes the driver that is guided on the guide path.

7. The drive according to claim 1, further comprising at least one of the gearings including a rocker as a transfer element, the rocker is adapted to carry out a limited rocking movement, the rocker is guided in a restricted manner such that the during a rocking movement a guide point of the rocker maintains a constant distance from a gearing-side fixed point, the rocker includes the driving hinge point and the output hinge point.

8. The drive according to claim 7, wherein at least one of the gearings, the rocker is guided in a restricted manner by a guide rod, the guide rod is pivotable around the guide point and is pivotable around a pivot axis, extending through the gearing-side fixed point.

9. The drive according to claim 7, further comprising the rocker has an outer contour formed like a segment of a circle with a radius, the gearing has a concave guide contour, formed like a segment of a circle with a radius, the guide contour radius is approximately twice as large as the radius of the outer contour of the rocker, and the outer contour of the rocker is in rolling contact with the concave guide contour.

10. The drive according to claim 9, wherein the outer contour of the rocker and the guide contour have, respectively, meshing teeth.

11. A cutting knife drive with a drive according to claim 1, wherein the output element has a connection mechanism that connects the output element to a cutting knife.

12. The mower of an agricultural machine with a drive according to claim 9, wherein the output element of a first gearing arrangement of the two gearing arrangements is connected to a first cutting knife and the output element of a second gearing arrangement of the two gearing arrangements is connected to a second cutting knife.

* * * * *